(12) United States Patent
Pochet

(10) Patent No.: US 6,231,142 B1
(45) Date of Patent: May 15, 2001

(54) SWITCH CABINET

(75) Inventor: Luc Pochet, Brussels (BE)

(73) Assignee: Hans Skeppner, Brussels (BE)

( * ) Notice: Subject to any disclaimer, the term of this patent is extended or adjusted under 35 U.S.C. 154(b) by 0 days.

(21) Appl. No.: 09/443,176

(22) Filed: Nov. 19, 1999

(30) Foreign Application Priority Data

Nov. 20, 1998 (DE) ............................................. 198 53 611

(51) Int. Cl.$^7$ ................................................. A47B 47/00
(52) U.S. Cl. ................................... 312/265.3; 312/265.1; 312/296; 211/189
(58) Field of Search ............................. 312/265.1, 265.2, 312/265.3, 265.4, 265.5, 265.6, 257.1, 296, 223.1, 140; 211/26, 189, 191, 182; 52/653.1, 653.2, 656.1, 730.4, 730.5, 730.6

(56) References Cited

U.S. PATENT DOCUMENTS

| | | | |
|---|---|---|---|
| 4,643,319 | * | 2/1987 | Debus et al. .......................... 211/189 |
| 5,333,950 | * | 8/1994 | Zachrai .............................. 312/265.1 |
| 5,769,519 | * | 6/1998 | Nicolai ........................... 312/265.4 X |
| 5,791,115 | | 8/1998 | Nicolai et al. ....................... 52/730.4 |
| 5,930,972 | * | 8/1999 | Benner et al. ...................... 52/653.1 |
| 5,971,511 | * | 10/1999 | Diebel et al. ..................... 312/265.3 |
| 5,992,646 | * | 11/1999 | Benner et al. ................ 312/265.3 X |

FOREIGN PATENT DOCUMENTS

| | | |
|---|---|---|
| 40 36 664 A1 | 5/1992 | (DE) . |
| 195 36 949 C2 | 10/1998 | (DE) . |

* cited by examiner

Primary Examiner—James O. Hansen
(74) Attorney, Agent, or Firm—Townsend and Townsend and Crew LLP

(57) ABSTRACT

A switch cabinet comprising a frame structure consisting of a plurality of interconnected frame profiles and cover elements. Each frame profile comprises two spaced-apart sealing edges or surfaces which can each be pressed onto an associated cover profile. The two sealing edges or surfaces divide the outer surfaces of the frame profiles into a first side surface area assigned to the interior of the switch cabinet and into a second side surface area facing away from the interior of the switch cabinet. Fastening or cover elements should be flexibly mountable with the sealing efforts being as small as possible. To this end the second side surface area (29) at least of the vertical frame profiles (7) is completely closed towards the interior (30) of the switch cabinet and comprises at least one laterally projecting fastening web (11, 12) which longitudinally extends between the sealing edges or surfaces (22, 25) and is provided with a row of holes and which is arranged on the outside of the second side surface area (29) which faces away from the interior (30) of the switch cabinet, the cover elements being fastened to the fastening web (11, 12) outside the interior (30) of the switch cabinet without any penetration of the wall of the frame profiles (7, 8, 9) towards the interior (30) of the switch cabinet (1).

18 Claims, 19 Drawing Sheets

SWITCH CABINET

The present invention relates to a switch cabinet comprising a frame structure consisting of a plurality of interconnected frame profiles and cover elements attached thereto, such as side, door, top, rear wall or bottom elements, each frame profile comprising two spaced-apart sealing edges or surfaces which can each be pressed onto an associated cover element, the two sealing edges or surfaces dividing the outer surfaces of the frame profiles into a first side surface area assigned to the interior of the switch cabinet and into a second side surface area facing away from the interior of the switch cabinet.

BACKGROUND OF THE INVENTION

Such a switch cabinet structure is e.g. known from U.S. Pat. No. 4,643,319. It concerns a frame structure for a switch cabinet which consists of at least twelve interconnected frame legs of the same hollow profile. The hollow profile is here provided with rows of holes and has a substantially square cross-section. A straight leg is arranged in extension of the one side edge of the hollow profile and presses against a seal, for instance, of a door. An L-shaped leg is arranged in extension of the other side surface of the hollow profile, which is arranged perpendicular to the first surface, with the one L-leg pressing against a side cover element with a seal being interposed. The various outwardly arranged elements are mounted on the hollow profile by means of screws which are inserted through openings on the inside of the hollow profile and are arranged with their heads in the interior of the hollow profile. The L-leg comprises recesses at specific places in order to position connection sleeves of the cover elements. However, the openings for putting screws therethrough are fixedly predetermined only at specific places because a respective sealing must be provided for at said places. The flexibility as to the mounting of outer elements is thereby influenced considerably.

A frame structure consisting of profile bars, in particular, for a switch cabinet is described in DE 4036664 A1. The tubularly closed hollow profiles comprise an L-shaped wall section oriented towards the interior of the switch cabinet and an outwardly oriented wall section stepped in the form of a W. Flanges are provided at the points of intersection of the two wall sections. One of the flanges is supplemented by a double-folded web. Both on its inner wall portion and on its outer wall portion, the hollow profile comprises penetrations or holes which are used for the most different elements to be fastened.

U.S. Pat. No. 5,791,115 discloses a frame leg for a frame structure of a switch cabinet. Said frame leg is made from two interconnected profile sheets. The hollow profile has a substantially triangular shape, with a bent web being formed at the point of connection of the two sheets. The one wall of the hollow profile is completely closed.

SUMMARY OF THE INVENTION

It is therefore the object of the present invention to provide a switch cabinet of the abovementioned type which is flexible as to the arrangement of outwardly mounted cover elements.

According to the invention this object is achieved in that the second side surface area at least of the vertical frame profiles is completely closed towards the interior of the switch cabinet and comprises at least one laterally projecting fastening web which longitudinally extends between the sealing edges or surfaces and is provided with a row of holes and which is arranged on the outside of the second side surface area which faces away from the interior of the switch cabinet, the cover elements being fastened to the fastening web outside the interior of the switch cabinet without any penetration of the wall of the frame profiles towards the interior of the switch cabinet.

To fasten the cover elements, there are fastening webs which are specifically provided for said purpose and assigned to the second side surface area. This also means that a predetermined row of holes which are e.g. arranged at a predetermined constant distance can be arranged therein without any sealing problems. The provision of a great number of fastening possibilities is of particular advantage to a flexible mounting of cover elements because of the fact that a sealing is no longer required. The openings which have so far been used for mounting purposes were partly produced during assembly so that a passage to the interior of the switch cabinet only existed at said places and the sealing action was simplified. The arrangement of the fastening web between the sealing edges or surfaces also simplifies the mounting process because the sealing edges or surfaces themselves are not penetrated by a fastening element, as is e.g. the case with the L-leg of DE 33 44 598 C1. Although it may happen that by reason of special models or for the mounting of corner connectors some penetrations are arranged in isolated fashion in the frame profile, it is preferred when the second side surface area is completely closed towards the interior of the switch cabinet.

It is of particular importance that the fastening means for the cover elements do not extend through the second side surface area towards the interior of the switch cabinet but are mounted by means of the row of holes on the fastening web.

The fastening web may be arranged substantially in parallel with the associated cover element attached thereto so that the fastening web can also serve as a large contact surface.

To be able to mount cover elements arranged perpendicular to one another in an identical manner over a surface which is as large as possible, two fastening webs are preferably arranged on the second side surface area at a distance from and a right angle to each other. When the entire frame structure is viewed, the fastening legs can form a large-surface fastening frame at each side, the frame considerably simplifying a mounting of the cover elements. Since a sealing is not needed at said fastening points, an exactly defined contact of the cover elements is established with the fastening webs so that a sealing operation can be performed at another place with an exactly predetermined preload and thus with a predeterminable pressing operation against a seal.

Since the frame profiles are made accessible from one side in a particularly satisfactory manner, two fastening webs can be arranged on the side surface area at a distance from and in parallel with each other. Such a configuration is in particular suited for switch cabinets which are arranged in alcoves, as the accces for mounting the fastening means from the access side is thereby made easier.

In a very compact constructional form of the frame profiles, the fastening web has an L-shape when viewed in cross section, the first L-leg being substantially arranged at a right angle relative to a second L-leg. Each L-leg can then be provided with a row of holes of its own, so that a single fastening web is sufficient for a fastening in two planes.

In a further embodiment, the fastening web is arranged at a distance from a closed wall section of the second side surface area in such a manner that an insertion groove in which the row of holes terminates laterally is formed at the side of the fastening web which faces away from a mountable cover element. The insertion groove may be used for receiving a screw head or a nut or any other specifically formed fastening element, so that the cover elements can easily be mounted from the outside of the frame structure without any access from the interior of the switch cabinet being required. Although the use of standard nuts is of course preferred, the insertion groove may have arranged therein a nut element which is arranged in a special manner and held in the insertion groove such that it cannot be rotated, and which can be accessed via a hole of the row of holes. A tight screwing can then be performed from the outside without an access to the nut element being required.

For reasons of stability and low weight, it is preferred when at least one frame profile is formed from a hollow tubular profile and when the at least one fastening web extends away from the cavity of the hollow profile such that the row of holes does not communicate with the cavity. This means that the fastening web does not form a wall portion of the cavity, but is laterally formed on the hollow tubular profile. It is thereby ensured that the row of holes does not provide for a connection between the interior and exterior of the switch cabinet.

To need as little material as possible for realizing the solution according to the invention, the at least one fastening web may directly adjoin the cavity of the hollow tubular profile according to a variant. Hence, the fastening web need not be formed on the profile in a complicated way.

The hollow tubular profiles can preferably be produced in a roller-type bending process, with the fastening webs being separated from the cavity by folding two wall sections onto each other. This way of producing hollow tubular profiles has turned out to be successful in the field of frame structures for switch cabinets and ensures the use, for instance, of steel materials. The folding of at least two wall sections onto each other can be performed by way of said technique in such a manner that an adequate seal is provided between the fastening web and the hollow profile of the profile. The fastening web can be regarded as an integral component with a double wall thickness.

To avoid a sealing edge or surface which is sharp-edged, the sealing edge or surface is preferably formed by a wall portion of the frame profile which surrounds a portion of the cavity. As a consequence, the fastening web has to be designed such that it is separated from the section forming the sealing edge or surface. However, it may adjoin said section.

It is also possible that the sealing edge or surface is formed by a sealing web. For a large-surface press contact the web may also surround a portion of the cavity.

Moreover, the sealing web may comprise a front face, and at least one fastening web may extend in extension of the front face or in slightly offset fashion parallel thereto. This means that the cover elements can be fastened directly next to the sealing place. Such an arrangement of the fastening web is particularly well suited for mounting the side, top and bottom walls as these members remain on the frame profiles with their seals at any rate.

By contrast, at least one fastening web may extend at the base of the sealing web in a direction perpendicular thereto. Such a variant of arrangement is preferably used in door or rear wall elements because more stable fastening types which require more space must here be provided as a rule.

Furthermore, at least one row of holes is preferably provided in the first side surface area for mounting installations in the interior of the switch cabinet. To obtain a row of holes which is also as easily accessible as possible from the interior of the switch cabinet, at least one access groove may be formed into the first side surface area due to the form of at least one portion of the wall of the first side surface area, with the access groove making the back side of the at least one row of holes accessible. By analogy with the insertion groove on the second side surface area, nuts or specifically designed fastening elements may here also be introduced and mainly fastened by means of screws by engagement of a hole of the row of holes.

Since the interior of the switch cabinet is sealed relative to the exterior by way of the closed second side surface area, the row of holes in the first side surface area can readily extend into the cavity of the hollow profile. In addition, the access grooves may be provided at their base with openings which are in alignment with the holes of the row of holes, so that the access grooves need not be as great as the engagement grooves on the second outer side surface area. Only for the sake of completeness, it should be noted that the installations can of course be mounted in the switch cabinet with the aid of similarly designed fastening webs without any access to the cavity of the hollow profile.

Furthermore, an L-shaped strip may be arranged on the second outer surface area on a respective wall portion adjoining the cavity, the first L-leg of said strip being arranged in a direction substantially perpendicular to the associated wall portion and the second L-leg being arranged substantially in parallel with the associated wall portion, with the second L-leg forming the fastening web. This is a simple design of the desired profiles, with the bottom of the insertion groove being possibly formed by the first L-leg. The width of the insertion groove will then depend on the distance of the fastening web from the associated wall portion.

It may be advantageous for the insertion of fastening elements when the free end edges of the fastening webs face away from each other.

Embodiments of the present invention shall now be explained in more detail with reference to a drawing, in which:

DESCRIPTION OF THE PREFERRED EMBODIMENTS

Figure 1:
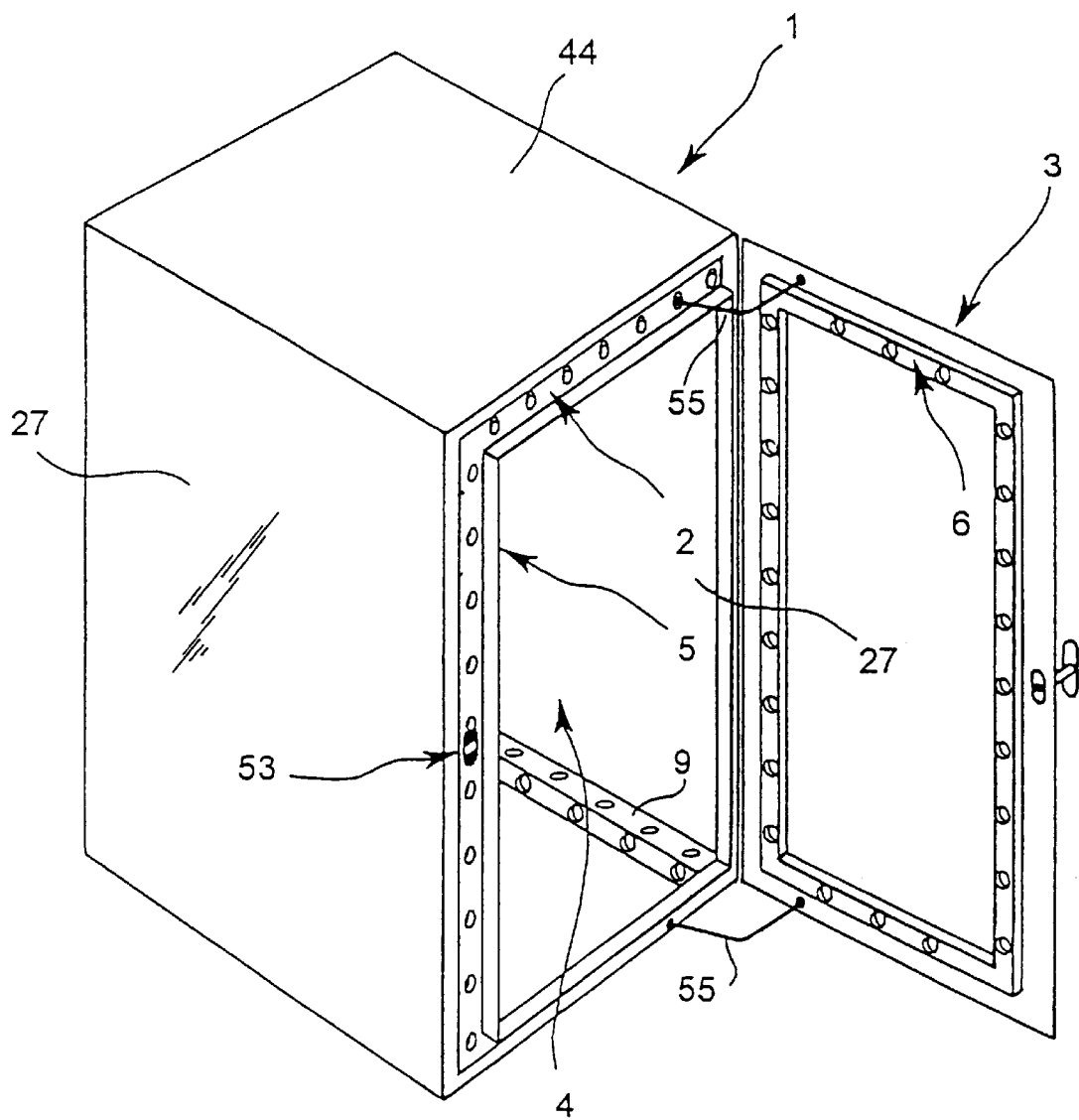
FIG. 1 is a schematic, perspective illustration of a switch cabinet.

FIG. 1 schematically shows a switch cabinet 1 comprising a frame structure 2 consisting of frame profiles which have mounted thereon the most diverse elements. For instance, a door 3 which closes a rectangular door opening 4 of the switch cabinet 1 is pivotably arranged on the front frame profile. The switch cabinet 1 is provided at its front side with a surrounding sealing web frame 5 which is engaged by the door frame 6.

The frame structure 2 of the switch cabinet 1 consists of twelve interconnected frame profiles. These are composed of four vertical profiles 7, four horizontal profiles 8 and four transverse profiles 9. While the cross section of the vertical profiles 7 and that of the horizontal profiles 8 are identical, the transverse profile 9 has a somewhat different cross-section.

Figure 2:
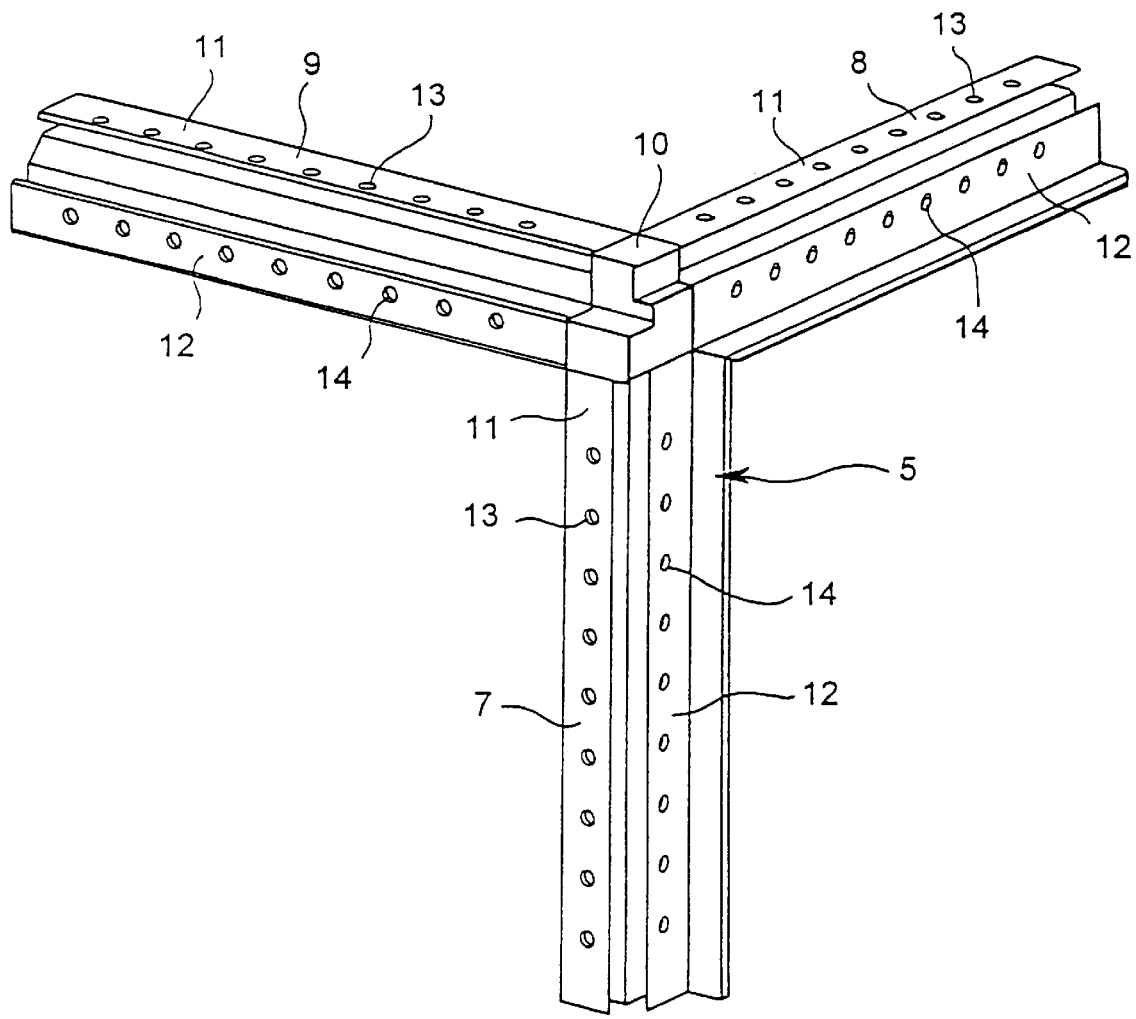
FIG. 2 is a perspective illustration showing the upper front corner of the frame structure of a switch cabinet.

FIG. 2 shows the upper left corner of a frame structure 2. Use is here made of a corner connector 10 which is anchored to the individual profiles in a manner not described in more detail, so that said profiles are arranged relative to one another at 900 each. All of the used profiles 7, 8, 9 are hollow tubular profiles produced by way of a roller-type bending method from a steel sheet. Each of the profiles 7, 8, 9 comprises a fastening web 11 and 12, respectively, in parallel with the cover element to be mounted. To mount the cover elements substantially in any desired manner, each fastening web is provided with a row of holes 13 and 14, respectively, which are each arranged at a distance from the edge of the fastening web 11 and 12, respectively, and are uniformly spaced apart from one another.

Figure 3:
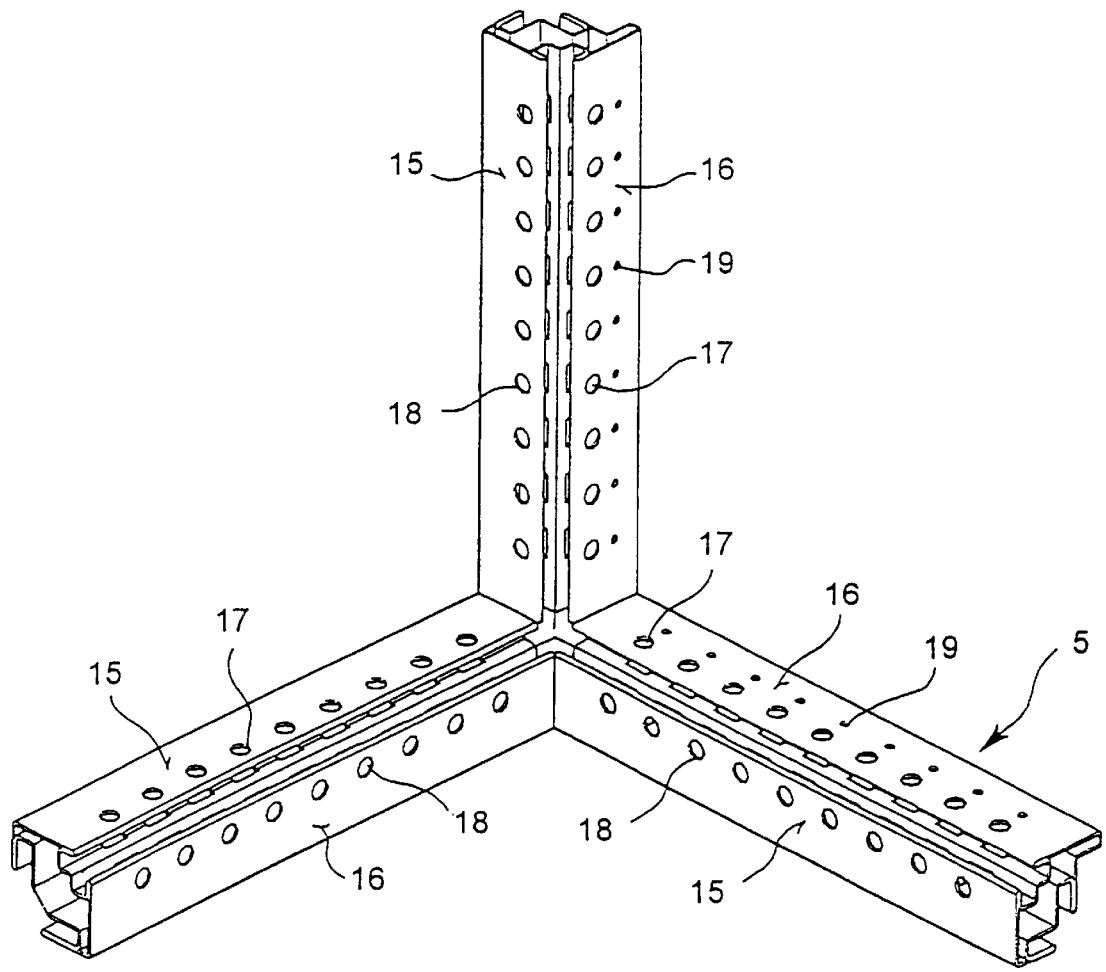
FIG. 3 is a perspective illustration showing the front lower right-hand corner viewed from the interior of the switch cabinet.

FIG. 3 shows the diagonally opposite corner of the door frame 6 viewed from the interior of the switch cabinet. Each of the insides 15 and 16 is also provided with holes 17 and 18, respectively, arranged in a row of holes. The profiles 7, 8 of the sealing web frame 5 are even provided with an additional row of smaller holes 19 arranged in parallel with the row of holes 17.

The cross section of a vertical profile shall now be explained in more detail with reference to FIG. 4. The insides 15 and 16 are vertically arranged with respect to each other and the axes of holes 18 and 17 and 19, respectively, are also oriented to be perpendicular to each other. The wall of the vertical profile 7 surrounds a cavity 20 in which the holes 17, 18 and 19 terminate.

However, it can also be seen that the holes 13 and 14 in the fastening webs 11 and 12 have no connection to the cavity 20. A sealing web 21 which also surrounds a portion of the cavity 20 and which presses with a front sealing surface 22 against a seal 23 of a door 3 is arranged in extension of the inside 16 of the vertical profile 7. For reasons of simplification the door frame 6 has not been drawn. The inside 15 in its extension also comprises a sealing web 24 which surrounds a portion of the cavity 20 and provides a sealing edge 25 which presses against a seal 26 of a side wall element 27.

Since the sealing webs 21 and 24 and the associated seals 23 and 26, respectively, extend over the entire length of the vertical profile 7, the side walls of the hollow profile are subdivided into a first side surface area 28 and a second side surface area 29. The first side surface area 28 faces the interior 30 of the switch cabinet and the second side surface area 29 faces away therefrom. When the door 3 is closed and the seals 23 and 26, respectively, are in an abutting position, the outside of the second side surface area 29 is entirely decoupled from the interior 30 of the switch cabinet. Nevertheless, in order to arrange the cover elements, e.g. the door 3 or the side wall element 27, on the vertical profile 7, the fastening webs 11 and 12 are provided on the second side surface area 29. These are formed by folding a wall portion of the profile form so that no component of the cavity 20 exists between said folded wall portions. The fastening web 12 is oriented in parallel with the inside 15, and the fastening web 11 in parallel with the inside 16. Thus the fastening webs 11 and 12, respectively, also extend in parallel with the door 3 and the side wall element 27, respectively. As can also be seen in FIG. 4, the side wall element 27 comprises an opening 31 for a countersunk head screw which is in alignment with the opening 13 in the fastening web 11. Moreover, the side wall element 27 comprises an inwardly bent edge 32 which is arranged in exact extension of the fastening web 12.

The fastening web 12 extends in the vertical direction from the base portion of the sealing web 21, thereby having a predetermined parallel distance from the door 3. The cavity 33 which is thereby formed between the door and the fastening web 12 serves the purpose of arranging large connection elements, such as hinges, etc., which will be described in more detail further below.

The vertical profile 7 is shaped such that an insertion groove 36 and 37, respectively, is formed on the back side 34 and 35, respectively, of the fastening webs. Each of the insertion grooves 36 and 37 has a rectangular cross-section and the openings thereof are oriented towards each other such that an inwardly offset rectangular corner 38 is formed. Since the free ends of the fastening webs 11 and 12 are spaced apart from each other, the insertion grooves 36 and 37 are freely accessible, and suitable fastening elements (not shown), such as specifically designed or also standard nut elements, can be inserted into said grooves. As a result, the cover elements can be secured to the second side surface area 29 without any penetration of the wall or engagement into the cavity 20.

The fastening web 11 is formed as an extension of the front side of the sealing web 24 so that the side wall element 27 can be connected to the vertical profile 7 directly next to the seal 25.

In a way similar to the second side surface area 29, a molding is made on the first side surface area in such a manner that access grooves 39 and 40, respectively, are arranged at right angles relative to each other. Since the first side surface area 28 may have a connection to the cavity 20, penetrations 41 and 42, respectively, are formed into the base of the access grooves 39, 40. An inwardly offset corner 43 is formed by the access grooves 39 and 40 having a rectangular cross-section. Each of the access grooves 39 and 40 serves the arrangement of fastening elements, such as screw-in nuts, for securing installations within the switch cabinet.

Although a vertical profile 7 has only been described with reference to FIG. 4, the horizontal profiles 8 have the same cross-section so that the above description is more or less equally applicable to the horizontal profiles 8. Instead of the side wall element 27, a top element or bottom element is mounted on the horizontal profiles 8.

Figure 5:
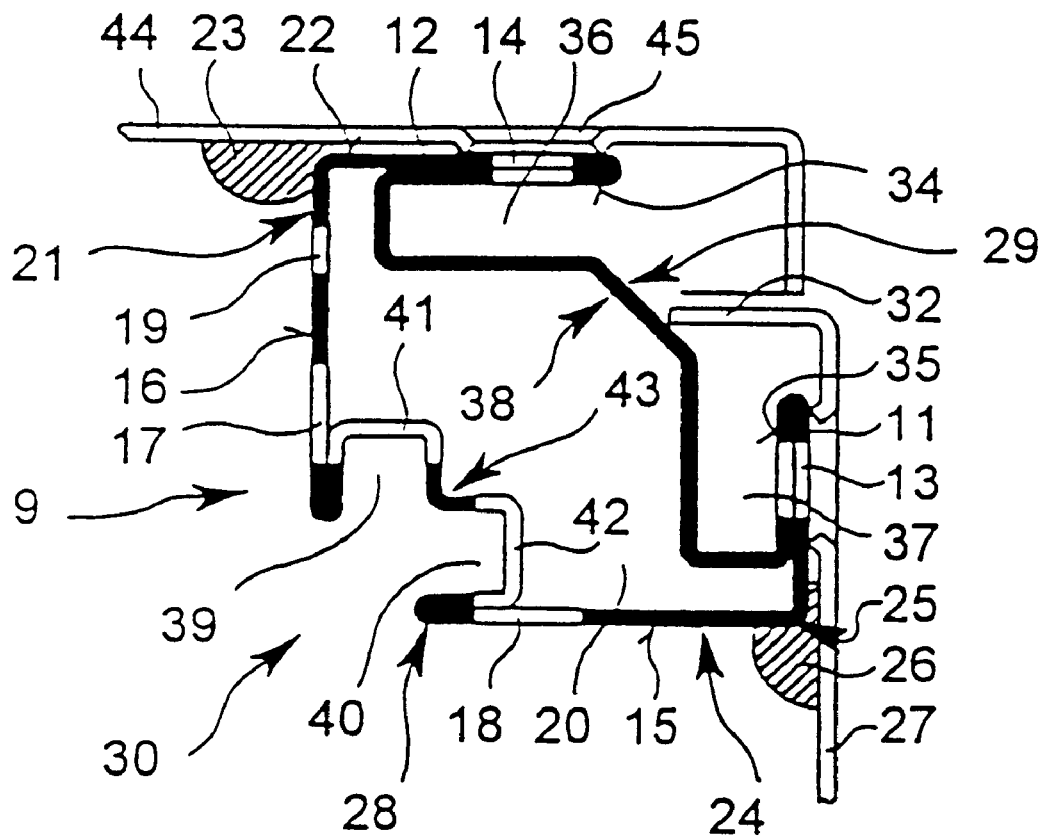
FIG. 5 is a cross-sectional view of an upper right-hand transverse profile.

The cross-section of the associated transverse profile 9 shall now be explained in more detail with reference to FIG. 5. It should be noted that the first side surface area 28 is made identical with the vertical and horizontal profiles 7, 8. The fastening web 11 together with the associated insertion groove 37 is also formed in an identical manner. The main difference consists in that the fastening web 12 is formed in extension of the front side 22 of the sealing web 21. The fastening web 12, however, is still oriented in a direction perpendicular to the fastening web 11 and provided with an insertion groove 36 arranged in parallel on the back side 34 thereof. Since the fastening webs 11 and 12 and the insertion grooves 36, 37, respectively, are extended further apart, the cavity 20 also becomes somewhat larger. The corner 38 may also generously be designed as a chamfer. The fastening web 12 has mounted thereon a top element 44 with an associated seal 23 by way of the opening 45 and fastening means (not shown). Suitable fastening means can be used in the already described manner in the insertion grooves 36 and 37, respectively, without any access to the cavity 20 of the transverse profile 9. Otherwise, the description of the above profile is equally applicable.

Figure 4:
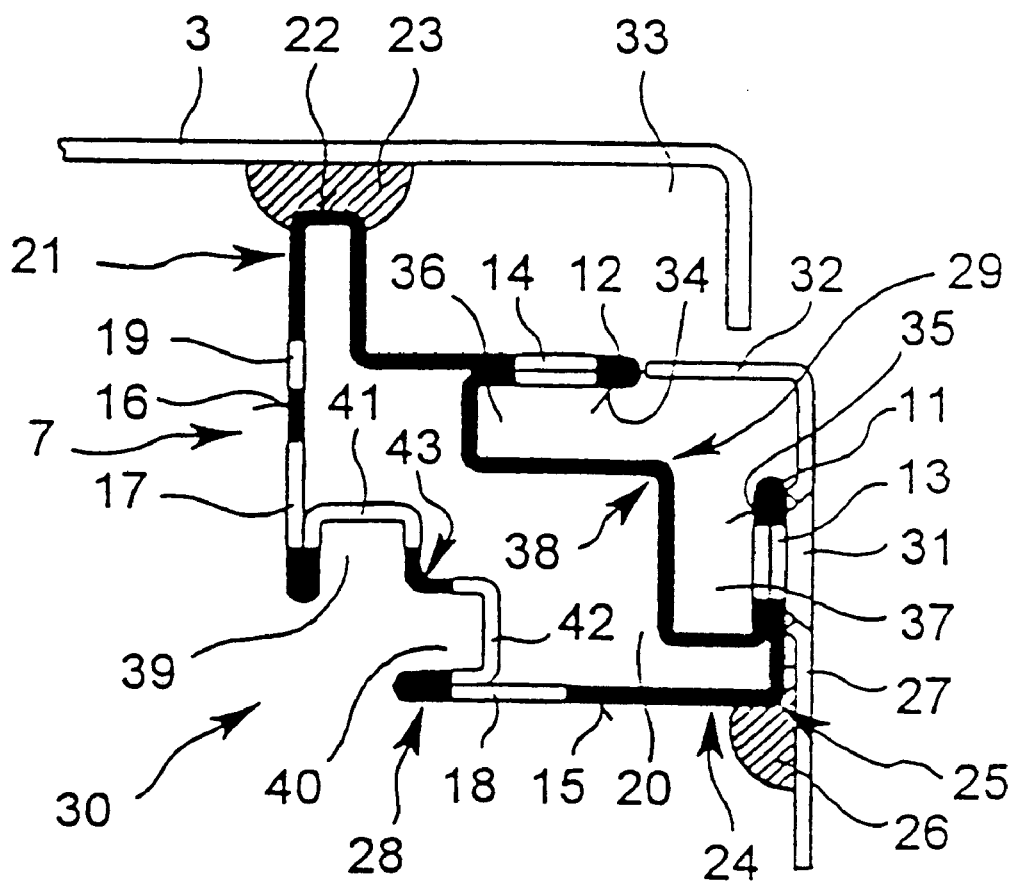
FIG. 4 is a cross-sectional view of the front left-hand vertical profile with attachments.
Figure 6:
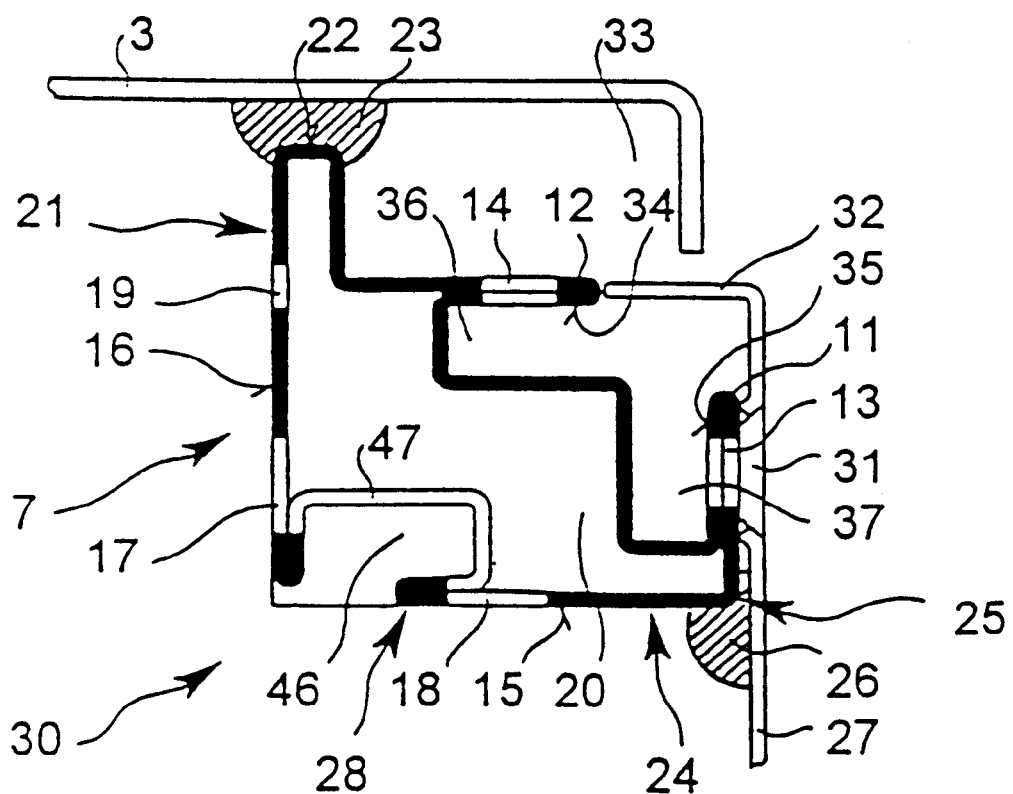
FIG. 6 is a cross-sectional view showing a variant of the front left-hand vertical profile with attachments.

FIG. 6 shows a vertical profile 7 which is slightly modified in comparison with FIG. 4 and which can also be used as a horizontal profile 8. In this case the second side surface area 29 is made identical with that of FIG. 4, and modifications have only been made with respect to the first side surface area 28, i.e., the access grooves 39 and 40 have been combined to form a single access groove 46. As a consequence, the holes 17 of the row of holes can be mounted at a greater distance from the front face 22 of the sealing web 21. Such a design may be advantageous in the case of a correspondingly high door frame 6, so that the mounting of the installations is not obstructed. In the area of the holes 17 and 18 the access groove 46 is provided with a continuous penetration 47 for the arrangement of fastening elements.

A few fastening variants using the above-described profiles shall now be explained in more detail with reference to FIGS. 7 to 11.

Figure 7:
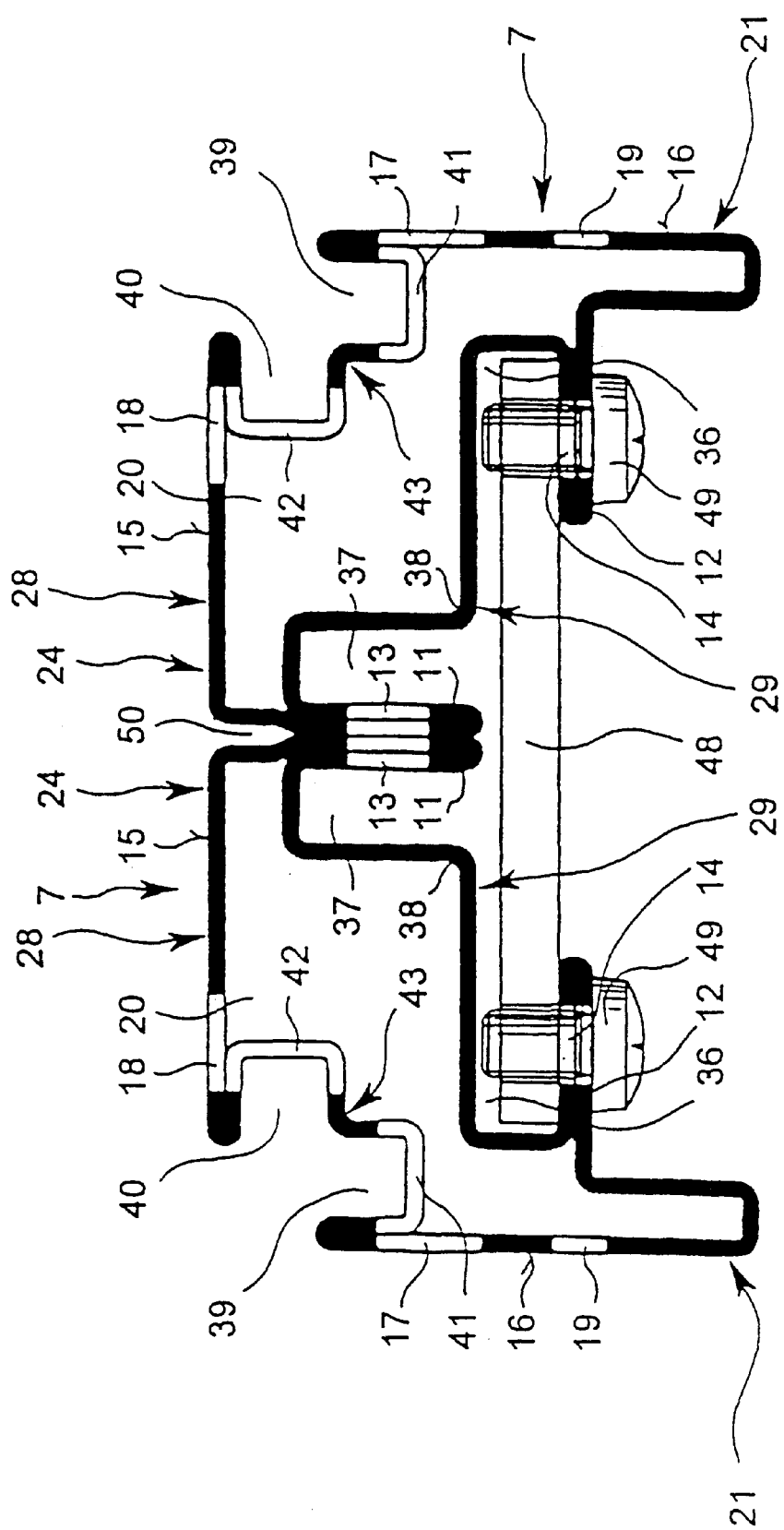
FIG. 7 is a cross-sectional view showing a connection variant of two front vertical profiles.

FIG. 7 shows the connection of two vertical profiles 7 by using a connecting web 48 which is mounted by means of screws 49 put through the holes 14 of the fastening webs 12. In the case of the profiles used in FIG. 7, the fastening web 11 is slightly offset with respect to the front face of the sealing web 24, resulting in the formation of a gap 50 into which a seal can be inserted. A plurality of frame structures 2 can thus be mounted side by side without the use of side wall elements and can be connected to one another.

Figure 8:
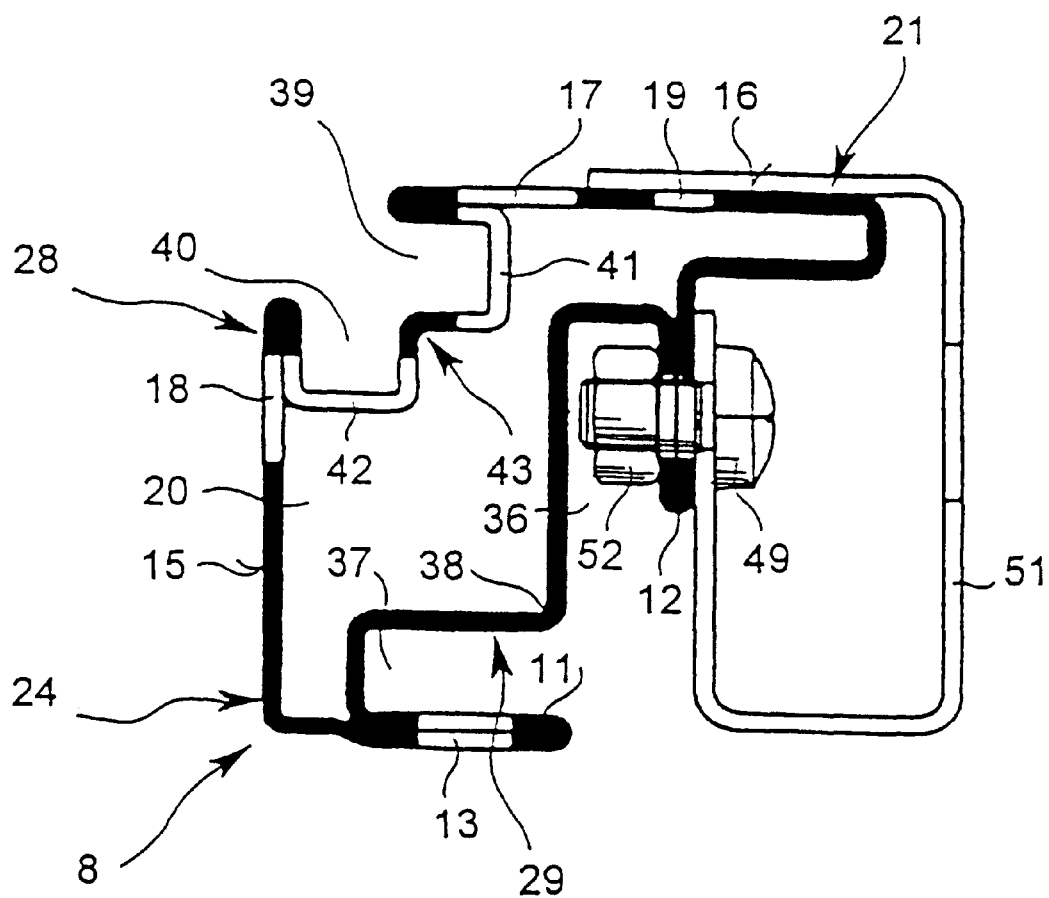
FIG. 8 is a cross-sectional view showing a lower horizontal profile with a decorative strip.

FIG. 8 shows the use of a decorative strip 41, e.g. in the base area, for achieving an optically appealing design. The arrangement of a standard nut 52 in the groove 36 is very clearly visible in FIG. 8.

Figure 9:
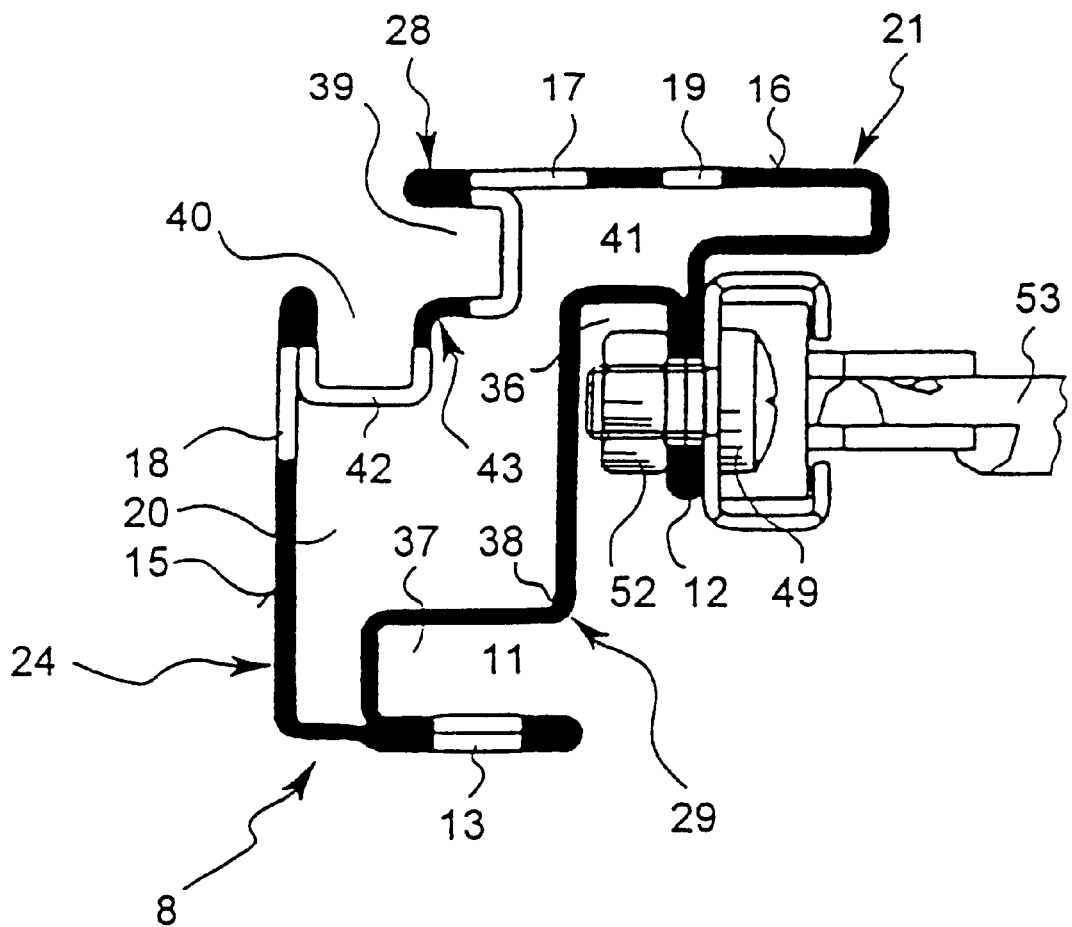
FIG. 9 is a cross-sectional view showing a lower horizontal profile with an attached hinge element.

FIG. 9 illustrates the mounting of a door lock 53. As shown in FIG. 1, the lock need not extend through the door opening 4, whereby acccess to the switch cabinet 1 might be obstructed. Rather, the arrangement is made outside the interior 30 of the switch cabinet on the horizontal profile 8.

Figure 10:
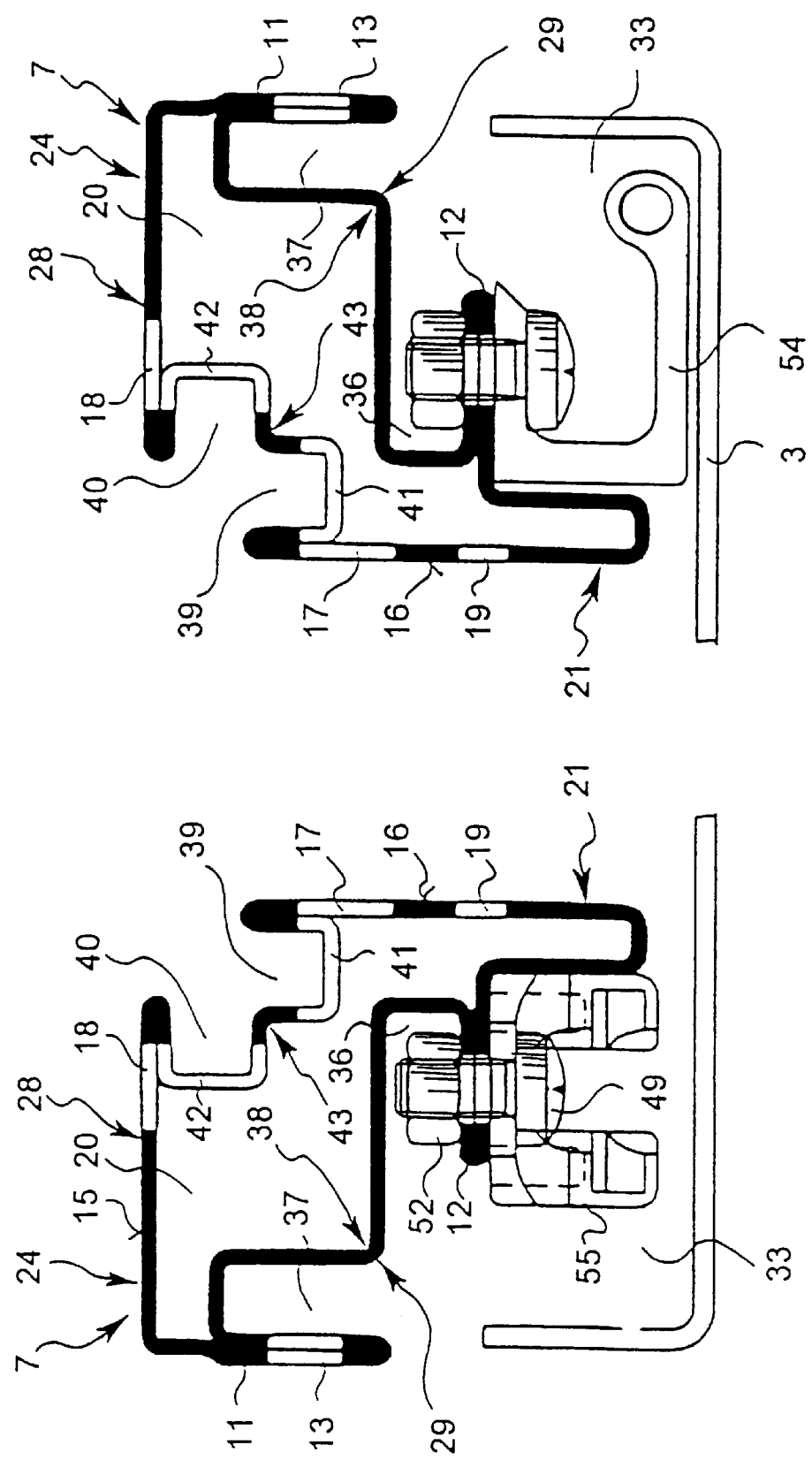
FIG. 10 is a cross-sectional view showing the two front vertical elements with mounting of the door.

FIG. 10 shows the mounting of the door 3 by means of a hinge 54 and a door latch 55. Each of these elements can be secured to the outside of the profiles in the way which has already been described.

Figure 11:
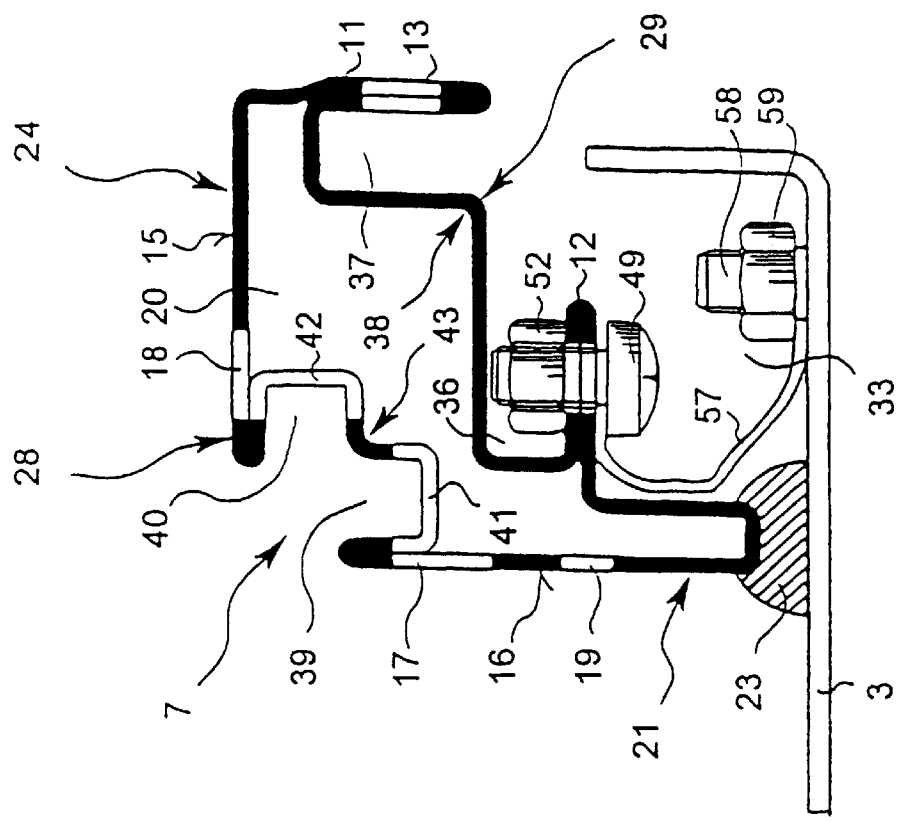
FIG. 11 is a cross-sectional view showing the grounding and shielding variants on the vertical profiles.
Figure 11:
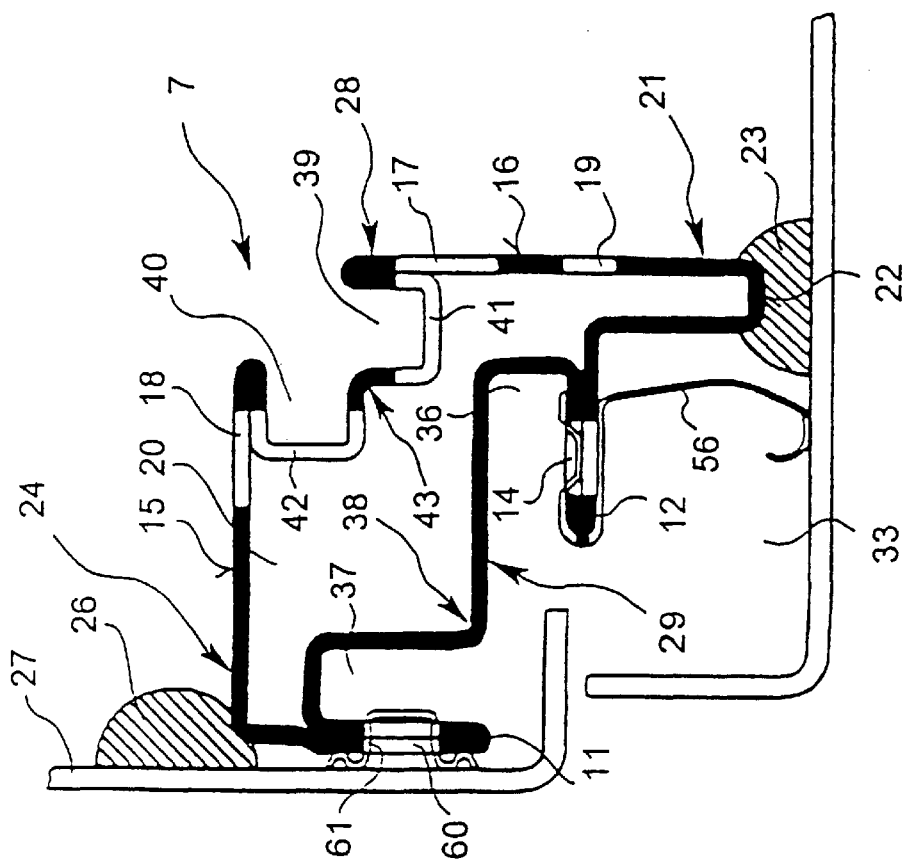

FIG. 11 shows a grounding or shielding variant, e.g. of the door 3. At the opening side, grounding is effected via a catch clip 56 which is connected to the fastening web 12 and which resiliently presses against the bare or electroplated inner surface of the door 3. When use is made of profiles that are also bare or electroplated, a grounding or shielding effect is thereby accomplished automatically. At the hinge side of the door, the grounding or shielding effect is accomplished by means of a stranded wire 57 which is screwed to the fastening web 12 by means of a screw 49 and a nut 52. A threaded bolt 58, which is provided on the inside of the door 3, and an associated nut 59 assist in fastening the stranded wire 57 to the door 3. For the sake of completeness, it should be pointed out that such elements can be mounted at almost any desired place, as the fastening webs 12 are provided with a row of holes.

As can be seen at the left side of FIG. 11, the side wall elements 27 may also be grounded or shielded in a suitable manner. The elements may be provided at a suitable place with a projection 60 which can be inserted into the opening 13 and which is locked by means of a holding clip 61 in the hole 13. In case the side wall element 27 is provided with lacquer on its inside, the holding clip 21 can also be used for scratching off the paint at a suitable place.

No seals have been drawn in FIGS. 7 to 10 for reasons of clarity.

Figure 12:
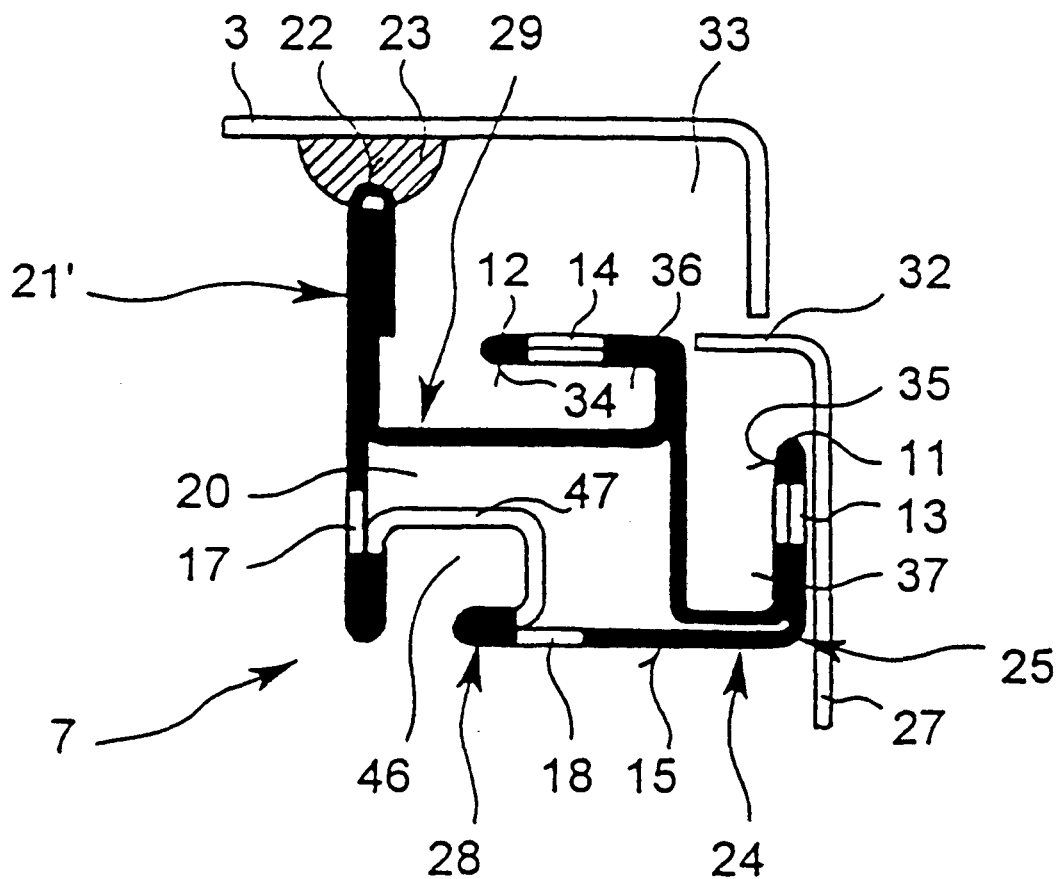
FIG. 12 is a cross-sectional view showing a variant of the front left-hand vertical profile with attachments.

FIG. 12 shows a further variant of a vertical profile 7. Such a profile shape can of course also be used for the horizontal profiles. The modification substantially concerns the design of the second outer surface area 29. The first side surface area 28 is made substantially identical with the variant according to FIG. 6. In this development the sealing web 21' encloses a portion of the cavity 20 because the free end edge has been produced by flanging, resulting in the formation of a three-layered sealing web 21' in the sealing area. The main difference consists in that the open ends of the insertion grooves 36 and 37 are not oriented towards each other as in the case of the other embodiments, but are oriented away from each other. As a consequence, it is much more easier to insert possible fastening means, for instance into the insertion groove 37. The fastening means are introduced into the insertion groove 36 through a gap provided between the sealing web 21' and the front edge of the fastening web 12.

Figure 13:
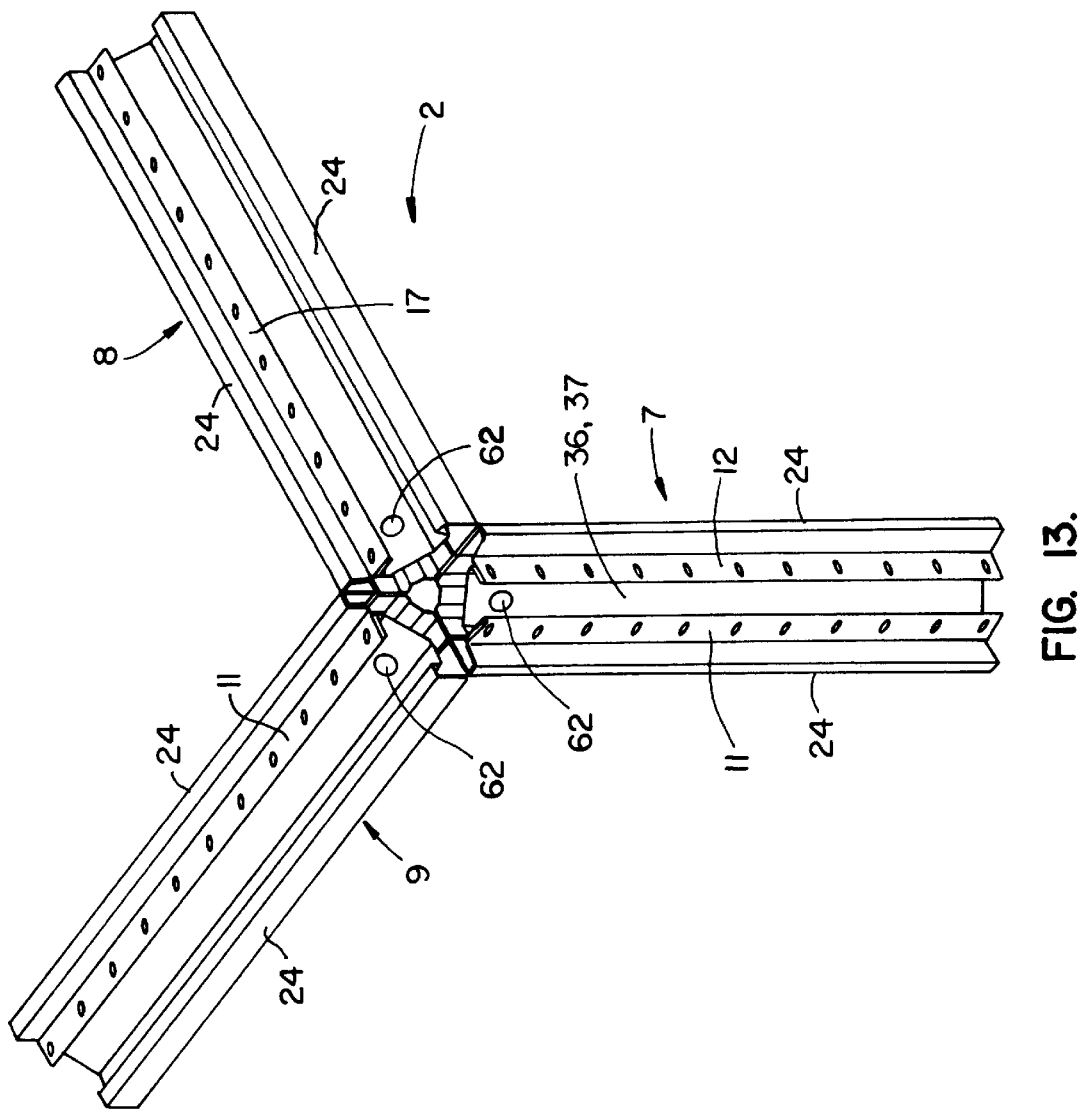
FIG. 13 is a perspective view showing the upper front end of the frame structure of a switch cabinet, the structure representing a further embodiment of frame profiles.

FIG. 13 shows the upper left corner of an embodiment of a frame structure 2. A corner connector is not drawn in the figure in order to make the adjoining cavities visible. As can be seen from said embodiment, the vertical profile 7 is made symmetrical with respect to an axis dividing the profile into two halves. The fastening webs 11 and 12 are thereby also oriented in symmetry with each other and face each other with their free ends. The insertion groove 36' which is partly surrounded by the fastening webs 11 and 12 is designed such that a suitably shaped fastening element can be inserted into the groove for fastening purposes so as to permit a fastening operation on the two fastening webs 11 and 12 at the same height. The horizontal profiles 8 and transverse profiles 9 which form the top frame are not made symmetrical. These profiles comprise only one fastening web 11. However, a larger sealing web 24 is created by the shape of the profiles 8 and 9, the web having an L-shaped cross-sectional form and being designed as a hollow profile. This offers the possibility that wall elements which are mounted on the fastening webs 11 and 12 by means of fastening elements can be hung in at said place and can simultaneously be mounted on a seal. The openings 62 which are shown in the corner portion serve to fix the corner connector (not shown). The opening 62 and the corner connector are designed such that an automatic sealing effect is achieved at said place after the joining operation, and the second side wall area 29 can again be regarded as being closed.

Figures 14, 14A:
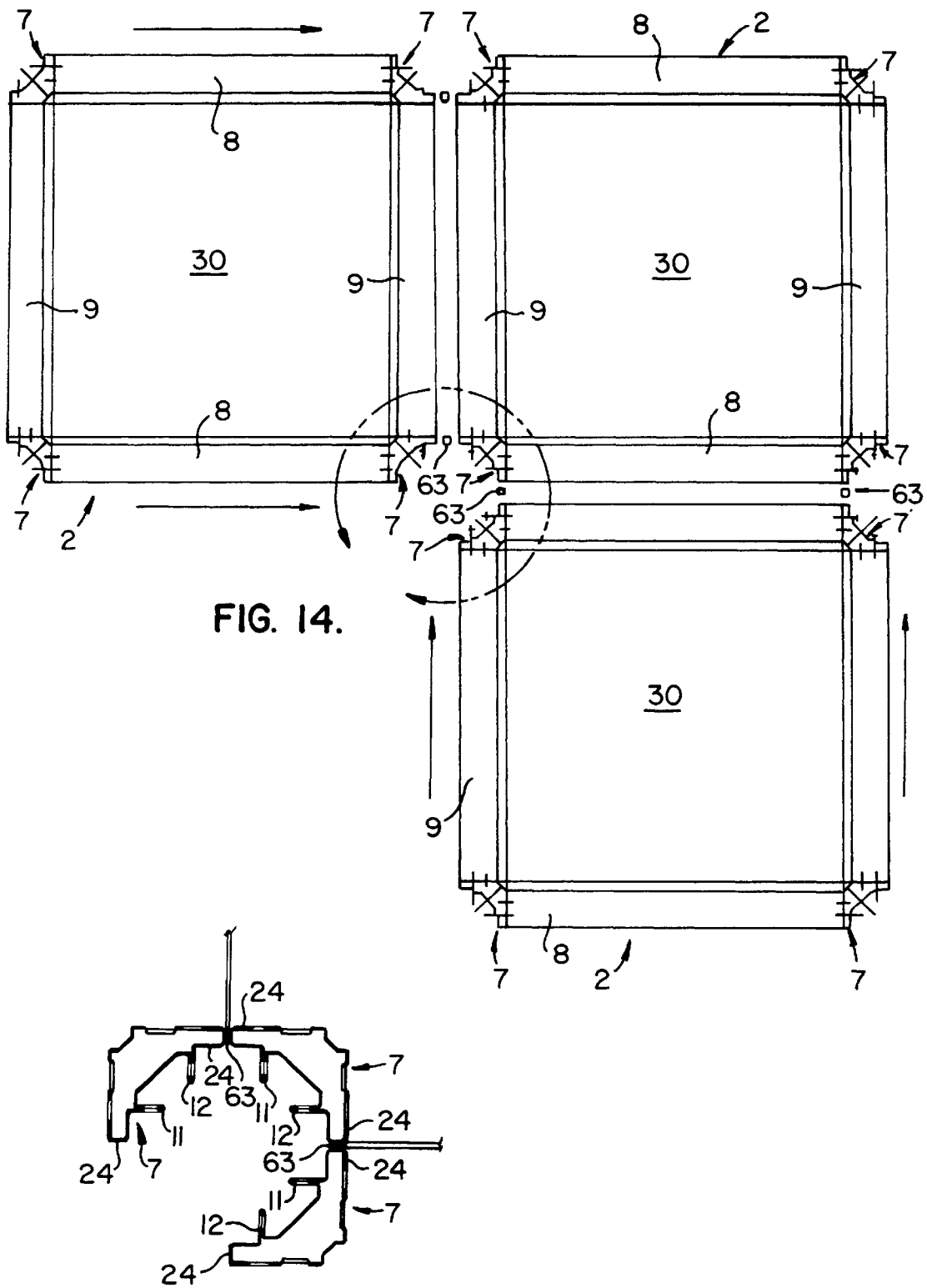
FIG. 14 is a schematic cross-sectional view showing the arrangement of a plurality of frame structures side by side.
FIG. 14a is an enlarged view showing the joining of the vertical profiles of a plurality of frame structures that are arranged side by side.

A further advantage of the profile shown in FIG. 13 becomes apparent from FIGS. 14 and 14a which show a variant of arrangement. It is possible thanks to the symmetrical design of the vertical profiles 7 to join frame structures both laterally and one after the other by simply interposing a longitudinal seal 63. The fastening webs 11 or 12 of neighboring vertical profiles 7 which are assigned to one another are then oriented in parallel with each other, and suitable fastening means will then guarantee an adequate fixing of the frame structures to one another. The seal is thereby subjected to a corresponding pressure and the desired sealing effect is achieved. Any desired number of frame structures configured in this manner can be joined, and only the outwardly oriented frame profiles whose sealing web frame 5 is no longer assigned to a further frame structure are covered by wall elements.

Figure 15:
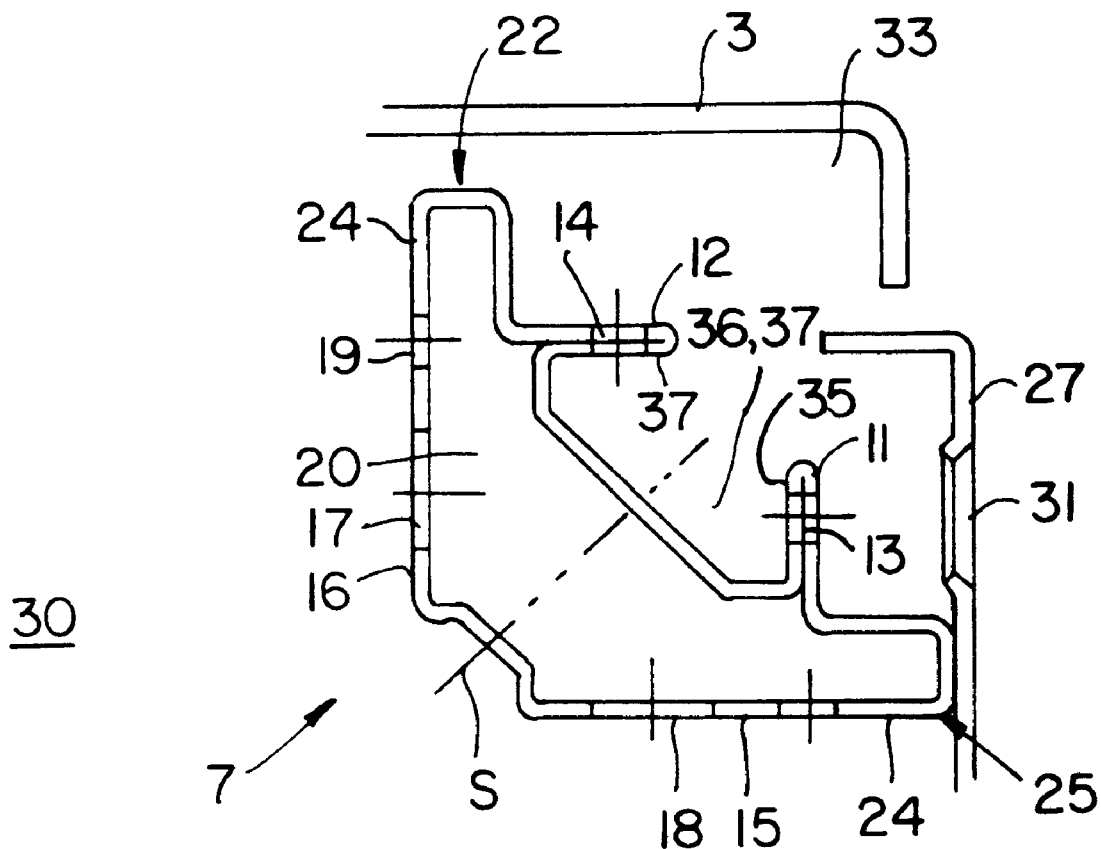
FIG. 15 is a cross-sectional view showing a variant of the front left-hand vertical profile with wall elements.

The design of the vertical profile shown in FIGS. 13 and 14 is illustrated in more detail in FIG. 15. As can clearly be seen, said profile 7 is made symmetrical with respect to an axis of symmetry S. To be more specific, said profile is without any pronounced design of access grooves, as has been the case in the preceding embodiments. Both the two sealing webs 24 and the two fastening webs 11 and 12 are oriented in a direction perpendicular to each other.

Further cross-sectional shapes of frame profiles shall briefly be explained in the following with reference to FIGS. 16 to 22. Only the important differences shall be discussed. Identical or similar elements are provided with the same reference numerals as used in the preceding embodiments.

Figure 16:
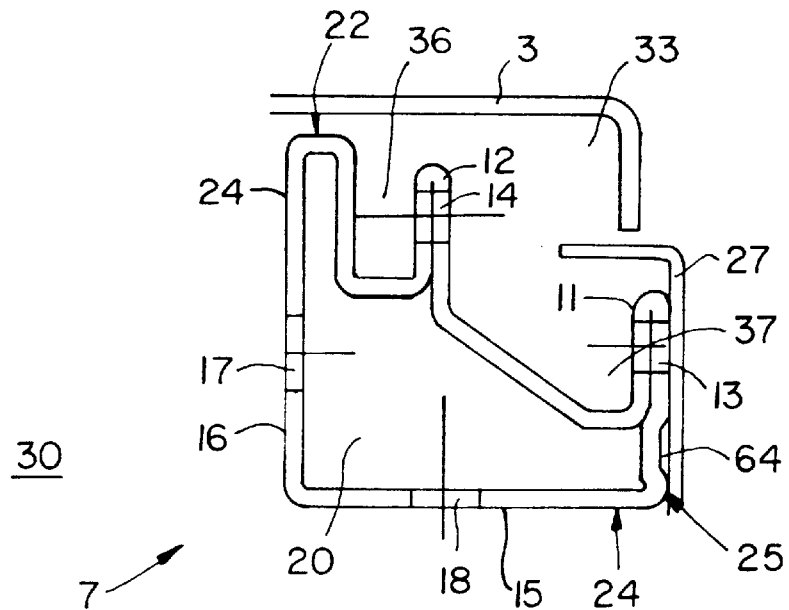
FIG. 16 is a cross-sectional view showing a variant of the front left-hand vertical profile with wall elements.

The vertical profile 7 according to FIG. 16 comprises two fastening webs 11, 12 oriented in parallel with each other, so that the insertion grooves 36 and 37 are also entirely separated from each other. In the present instance the fastening webs 11 and 12 extend in parallel with the sealing web 24, which forms part of the sealing web frame 5 at the door side of the frame profile. The fastening web 11 directly adjoins the front face of the other sealing web 24. The web is provided along its front face with a recess 64 into which a seal can be inserted. In this variant the fastening web 11 directly rests on the back side of a side wall element 27. The inside 15 and the inside 16 of the vertical frame profile 7 directly pass into each other at a corner having a rectangular shape.

Figure 17:
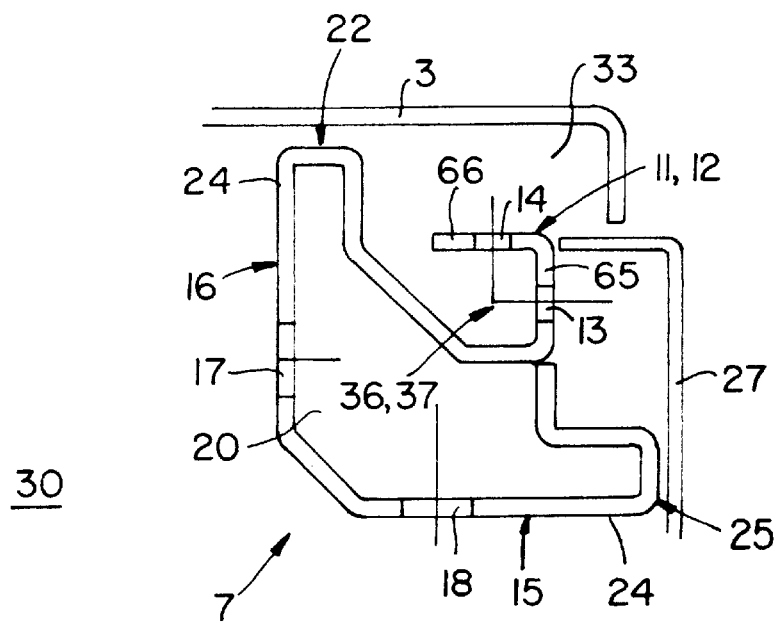
FIG. 17 is a cross-sectional view showing a variant of the front left-hand vertical profile with wall elements.

FIG. 17 shows an embodiment in which the fastening web 11 or 12 is not formed by double-folding during the roller-type bending process. Rather, the fastening web 11 or 12 is L-shaped when viewed in cross-section, so that there exists a first L-leg 65 and a second L-leg 66 that is arranged perpendicular thereto. Each of the L-legs 65 and 66 is provided with a row of holes of its own so that a fastening action is again possible in two planes. A very compact design is achieved through such an advantageous design of a fastening web 11 or 12 with the L-shape. The sealing webs 24 are again arranged perpendicular to each other. The insides 15 and 16 extend in a direction perpendicular to each other, passing into each other at a chamfered corner. As a result of the design of the fastening web 11 or 12, only one insertion groove 36 or 37 is formed.

Figure 18:
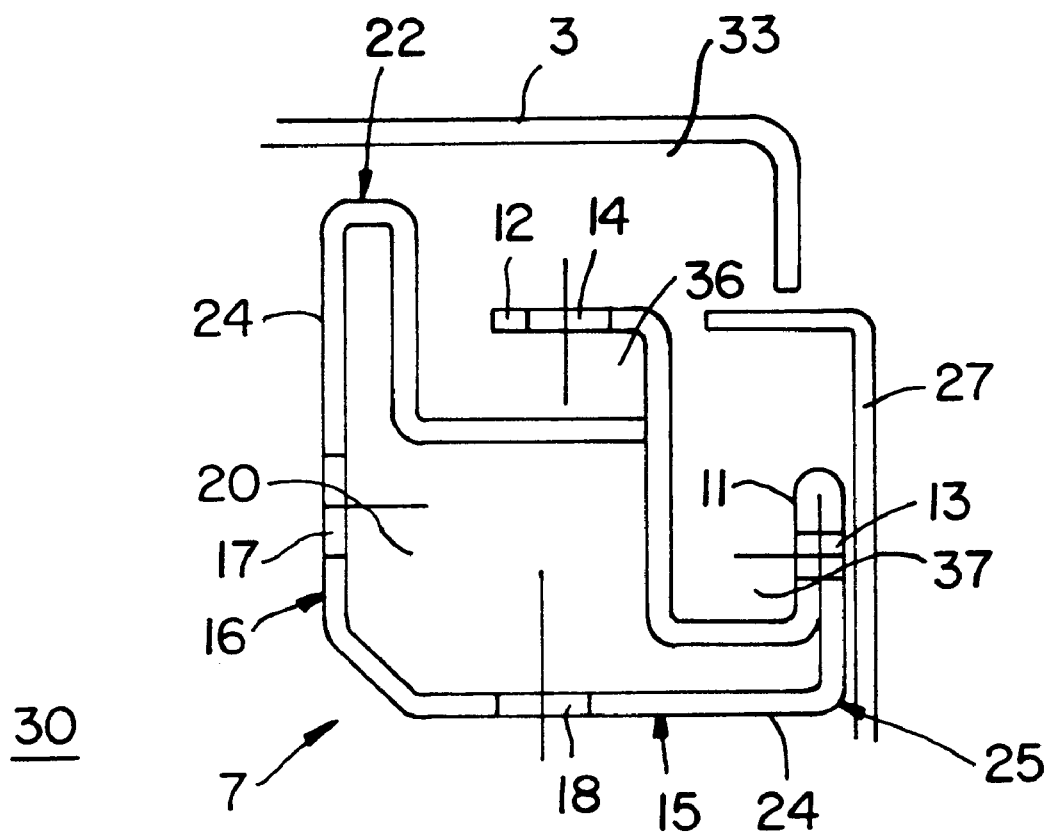
FIG. 18 is a cross-sectional view showing a variant of the front left-hand vertical profile with wall elements.

FIG. 18 shows a combination of a double-folded fastening web 11 and of a fastening web 12 simply formed thereon. The arrangement of the fastening webs 11 and 12 is similar to the embodiment shown in FIG. 12. However, there is no access groove 46, and the sealing web 24 at the door side is designed as part of the hollow profile.

Figure 19:
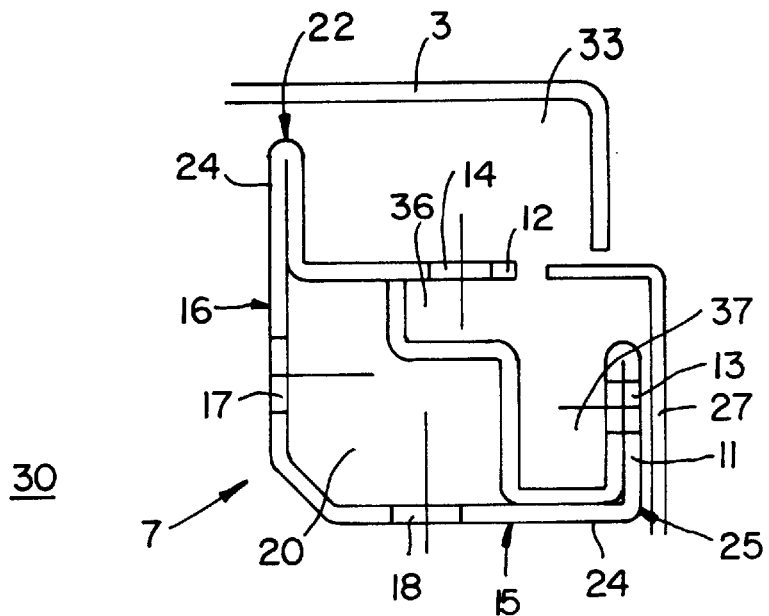
FIG. 19 is a cross-sectional view showing a variant of the front left-hand vertical profile with wall elements.

In the embodiment shown in FIG. 19, the fastening web 11 is again designed as a double-folded profile, and the fastening web 12 as a simple member formed thereon. The free ends of the fastening webs 11 and 12 face each other, so that the insertion grooves 36 and 37 are formed therebetween. In this embodiment the sealing webs 24 are also designed as double-folded material sections. The fastening web 11 directly adjoins the free end of the laterally extending sealing web 24. In this embodiment, too, there is no access groove on the insides 15 or 16.

Figure 20:
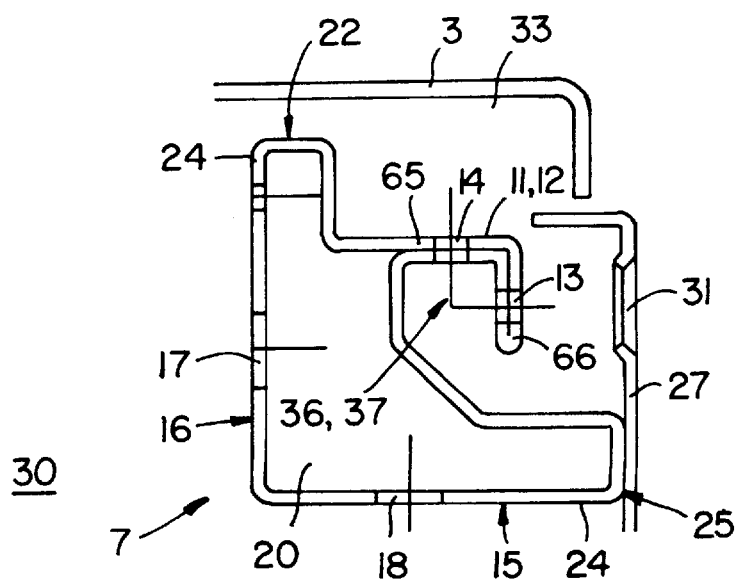
FIG. 20 is a cross-sectional view showing a variant of the front left-hand vertical profile with wall elements.

A further development without an access groove is depicted in FIG. 20. The figure shows an L-shaped fastening web 11 or 12 which adjoins the front sealing web 24 with its first L-leg 65 and extends with the second L-leg 66 in parallel with a side wall element 27. The sealing webs 24 are again part of the hollow profile whereas the fastening web 11 or 12 with its two legs 65, 66 is designed as a double-folded profile.

Figure 21:
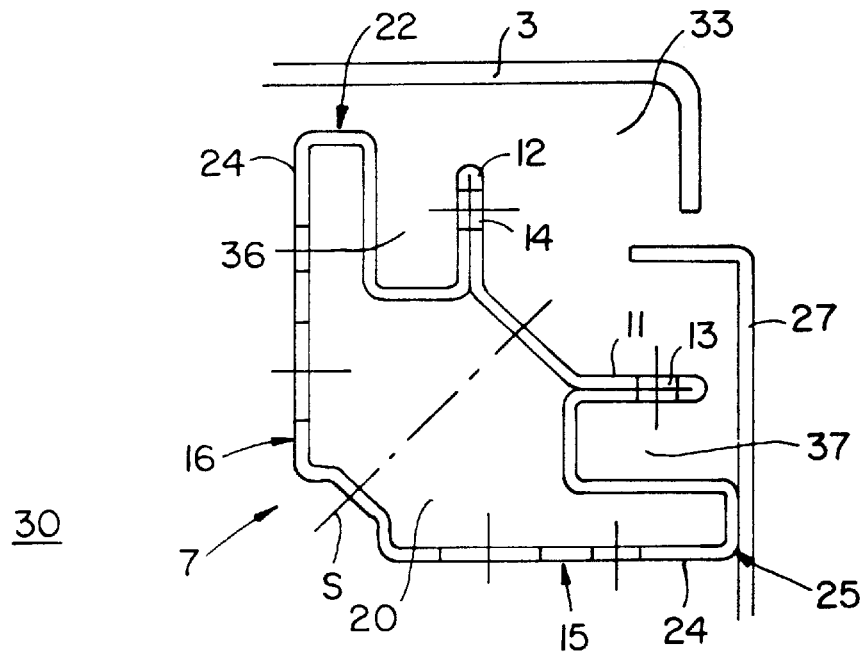
FIG. 21 is a cross-sectional view showing a variant of the front left-hand vertical profile with wall elements.

A frame profile which is also made symmetrical with respect to a line of symmetry S is shown in FIG. 21. The free ends of the fastening webs 11 and 12 face away from each other so that the insertion grooves 36 and 37 which are arranged between the adjoining sealing webs 24 are also separated from each other. The fastening webs 11 or 12 are each arranged in parallel with their directly adjoining sealing webs 24. An access groove is also missing in this embodiment. The insides 15 and 16 pass into each other through an inclined section.

Figure 22:
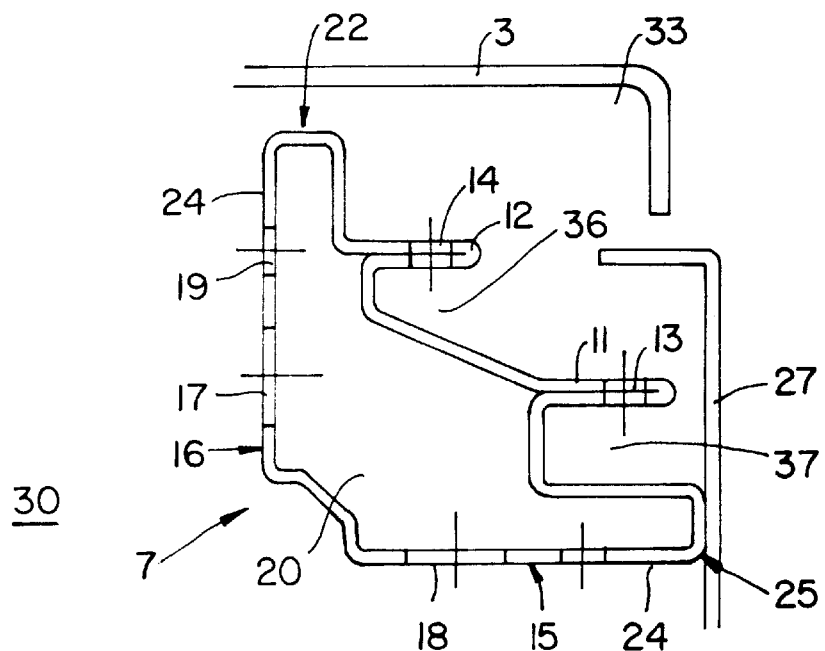
FIG. 22 is a cross-sectional view showing a variant of the front left-hand vertical profile with wall elements.

The embodiment according to FIG. 22 comprises two fastening webs 11 and 12 that are oriented in parallel with each other and double-folded and are spaced apart from each other. The orientation is such that the fastening webs 11 and 12 are oriented in parallel with the sealing web 24 which presses onto the side wall element 27. The sealing webs 24 are again part of the hollow profile, and an access groove which is oriented towards the interior of the switch cabinet is not provided for.

FIGS. 15 to 22 do not show seals for reasons of clarity. In case of need these are of course interposed between the sealing webs 24 and the adjoining wall elements.

It follows from the above that the embodiment according to the invention makes it possible to arrange numerous elements on the second side surface area 29 of the profiles without creating any sealing problems. In contrast to profiles which have so far been used, the profiles used in the embodiment already comprise suitable rows of holes arranged on the second side surface area 29, thereby permitting the many possibilities of arrangement mentioned above.

What is claimed is:

1. A switch cabinet (1) comprising:

a frame structure (2) consisting of a plurality of interconnected frame profiles;

cover elements attached thereto to define an interior (30) of the switch cabinet;

each frame profile comprising two sealing edges or surfaces (22, 25) that are spaced apart from one another and can each be pressed onto an associated cover element;

said two sealing edges (22, 25) dividing the outer surfaces of the frame profiles (7, 8, 9) into a first side surface area (28) facing the interior of the switch cabinet second a side surface area (29) facing away from the interior (30) of the switch cabinet;

the second side surface area (29) of the vertical frame profiles (7) being closed towards the interior (30) of the switch cabinet;

the side surface area (29) of the vertical frame profiles (7) defining at least one laterally projecting fastening web (11,12) between the sealing edges (22, 25), longitudinally extending there between, and facing away from the interior (30) of the switch cabinet;

the fastening web (11,12) is provided with a row of holes arranged on the outside of the second side surface area (29) which faces away from the interior (30) of the switch cabinet;

whereby the cover elements are fastened to the fastening web (11,12) outside the interior (30) of the switch cabinet without any penetration of a wall of the frame profiles (7, 8, 9) towards the interior (30) of the switch cabinet (1).

2. The switch cabinet (1) according to claim 1 and wherein:

the fastening web (11, 12) is arranged substantially in parallel with the associated cover element attached thereto.

3. The switch cabinet (1) according to claim 1 wherein:

two fastening webs (11, 12) are arranged on the second side surface area (29) at a distance from and at a right angle to each other.

4. The switch cabinet (1) according to claim 1 wherein:

two fastening webs (11, 12) are arranged on the second side surface area (29) at a distance from and in parallel with each other.

5. The switch cabinet (1) according to claim 1 wherein:

the fastening web (11, 12) has the shape of an L when viewed in cross section, the first L-leg (65) arranged substantially at a right angle with respect to a second L-leg (66).

6. The switch cabinet (1) according to claim 1 wherein:

the fastening web (11, 12) is arranged at a distance from a closed wall section of the second side surface area (29) to define at the side (34, 35) of the fastening web (11, 12) an insertion groove (36, 37) which faces away from a mountable cover element;

the insertion groove (36, 37) defining a row of holes terminating to the insertion groove (36, 37).

7. The switch cabinet (1) according to claim 1 wherein:

at least one frame profile (7, 8, 9) is formed from a hollow tubular profile having a cavity (20) and the at least one fastening web (11, 12) extends away from the cavity (20) of the hollow tubular profile so that the row of holes does not communicate with the cavity (20).

8. The switch cabinet (1) according to claim 7 wherein:

the at least one fastening web (11, 12) directly adjoins the cavity (20) of the hollow tubular profile.

9. The switch cabinet (1) according to claim 7 wherein:

the hollow tubular profiles are produced by bending with the fastening webs (11, 12) being separated from the cavity (20) by folding two wall sections.

10. The switch cabinet (1) according to claim 1 wherein:

the sealing edges or surfaces (22, 25) are formed by a wall portion of the frame profile (7, 8, 9) which surrounds a portion of the cavity (20).

11. The switch cabinet (1) according to claim 1 wherein:

the sealing edge or surface (22, 25) is formed by a sealing web (21, 24).

12. The switch cabinet (1) according to claim 11 wherein:

the sealing web (21, 24) comprises a front face, and at least one fastening web (11, 12) extends in extension of the front face or slightly offset in parallel therewith.

13. The switch cabinet (1) according to claim 11 wherein:

at least one fastening web (11, 12) extends at a base of the sealing web (21) in a direction perpendicular thereto.

14. The switch cabinet (1) according to claims 1 wherein:

at least one row of holes is provided in the first side surface area (28) for mounting installations in the interior (30) of the switch cabinet.

15. The switch cabinet (1) according to claim 14 wherein:

the shape of at least one portion of the wall of the first side surface area (28) defines at least one access groove (39, 40; 46) formed into the first side surface area (28), thereby ensuring access to a back side of the at least one row of holes.

16. The switch cabinet (1) according to claim 15 wherein:

the access groove (39, 40; 46) is provided at its base with openings (41, 42; 47) which are in alignment with the holes (17, 18) of the row of holes.

17. The switch cabinet (1) according to claim 11 wherein:

an L-shaped strip having a first L-leg and a second L-leg is arranged on the second side surface area (29) on a respective wall portion adjoining the cavity (20), the first L-leg of said strip being arranged in a direction substantially perpendicular to the associated wall portion and the second L-leg of said strip being arranged substantially in parallel with the associated wall portion, with the second L-leg forming the fastening web (11, 12).

18. The switch cabinet (1) according to claim 17 wherein:

the free end edges of the fastening webs (11, 12) face away from each other.

* * * * *